(12) United States Patent
Vannithamby et al.

(10) Patent No.: US 9,444,569 B2
(45) Date of Patent: Sep. 13, 2016

(54) METHOD TO IDENTIFY AND DIFFERENTIATE BACKGROUND TRAFFIC

(71) Applicant: Intel Corporation, Santa Clara, CA (US)

(72) Inventors: Rath Vannithamby, Portland, OR (US); Jing Zhu, Portland, OR (US); Satish Chandra Jha, Hillsboro, OR (US); Ali Taha Koc, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,536

(22) PCT Filed: May 10, 2013

(86) PCT No.: PCT/US2013/040618
§ 371 (c)(1),
(2) Date: Dec. 6, 2013

(87) PCT Pub. No.: WO2013/170194
PCT Pub. Date: Nov. 14, 2013

(65) Prior Publication Data
US 2015/0036569 A1 Feb. 5, 2015

Related U.S. Application Data

(60) Provisional application No. 61/646,223, filed on May 11, 2012.

(51) Int. Cl.
*H04J 3/16* (2006.01)
*H04J 3/00* (2006.01)
(Continued)

(52) U.S. Cl.
CPC ............... *H04J 3/1694* (2013.01); *H04B 1/56* (2013.01); *H04B 7/024* (2013.01); *H04B 7/0456* (2013.01);
(Continued)

(58) Field of Classification Search
CPC ... H04L 47/14; H04L 49/90; H04L 12/5693; H04L 29/0653; H04L 69/22; H04L 47/6275; H04L 47/2441; H04L 29/06095; H04L 45/302; H04L 47/2433; H04L 47/6215; H04L 61/2517; H04L 47/10; H04L 47/2475; H04L 47/623; H04W 72/1242
See application file for complete search history.

(56) References Cited

U.S. PATENT DOCUMENTS 6,167,445 A * 12/2000 Gai et al. ........................ 709/223
6,820,042 B1   11/2004 Cohen et al.
(Continued)

FOREIGN PATENT DOCUMENTS

JP    2010521076 A    6/2010
JP    2012519457 A    8/2012
(Continued)

OTHER PUBLICATIONS

Mediatek, "Identifying Background traffic", 1-2.
(Continued)

*Primary Examiner* — Ayaz Sheikh
*Assistant Examiner* — Debebe Asefa
(74) *Attorney, Agent, or Firm* — Schwegman Lundberg & Woessner, P.A.

(57) ABSTRACT

Embodiments of a system and method to identify and differentiate background traffic are generally described herein. In some embodiments, a transceiver is arranged to wirelessly transmit and receive packets over a communications network and a processor, coupled to the transceiver, is arranged to provide an indication identifying packets associated with background traffic. The indication identifying packets associated with background traffic includes a bit in a header of a packet, wherein the bit is set in a first state to indicate the packet is associated with background traffic and the bit is set in a second state to indicate the packet is associated with active traffic, or an identification of a port number and a protocol type associated with background traffic. The processor is further arranged to provide an indication for differentiating background traffic.

27 Claims, 9 Drawing Sheets

(51) Int. Cl.

| | | |
|---|---|---|
| H04B 7/02 | (2006.01) | |
| H04W 72/04 | (2009.01) | |
| H04W 72/10 | (2009.01) | |
| H04W 72/12 | (2009.01) | |
| H04W 72/08 | (2009.01) | |
| H04W 36/18 | (2009.01) | |
| H04W 36/00 | (2009.01) | |
| H04W 56/00 | (2009.01) | |
| H04W 88/06 | (2009.01) | |
| H04W 76/04 | (2009.01) | |
| H04W 76/02 | (2009.01) | |
| H04L 29/02 | (2006.01) | |
| H04B 7/26 | (2006.01) | |
| H04W 24/10 | (2009.01) | |
| H04B 1/56 | (2006.01) | |
| H04W 52/02 | (2009.01) | |
| H04W 4/22 | (2009.01) | |
| H04W 36/22 | (2009.01) | |
| H04B 15/00 | (2006.01) | |
| H04B 7/04 | (2006.01) | |
| H04B 7/06 | (2006.01) | |
| H04W 24/02 | (2009.01) | |
| H04W 4/00 | (2009.01) | |
| H04W 4/06 | (2009.01) | |
| H04W 48/20 | (2009.01) | |
| H04L 29/06 | (2006.01) | |
| H04W 4/02 | (2009.01) | |
| H04J 3/26 | (2006.01) | |
| H04L 27/26 | (2006.01) | |
| H04W 36/30 | (2009.01) | |
| H04W 72/02 | (2009.01) | |
| H04W 16/14 | (2009.01) | |

(52) U.S. Cl.
CPC ......... *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/0061* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/048* (2013.01); *H04W 16/14* (2013.01); *H04W 36/18* (2013.01); *H04W 36/30* (2013.01); *H04W 72/02* (2013.01); *H04W 88/06* (2013.01); *Y02B 60/50* (2013.01)

(56) References Cited

U.S. PATENT DOCUMENTS

| | | | |
|---|---|---|---|
| 8,606,290 B2 * | 12/2013 | Gerber et al. ............ 455/452.2 | |
| 2006/0007862 A1 | 1/2006 | Sayeedi et al. | |
| 2008/0039154 A1 | 2/2008 | Jang | |
| 2009/0325512 A1 | 12/2009 | Granlund et al. | |
| 2011/0211449 A1 | 9/2011 | Attar et al. | |
| 2012/0058773 A1 | 3/2012 | Gerber et al. | |
| 2012/0072612 A1 | 3/2012 | Flinta et al. | |

FOREIGN PATENT DOCUMENTS

| | | |
|---|---|---|
| KR | 970000665 B1 | 1/1997 |
| WO | WO-2010117522 A2 | 10/2010 |
| WO | WO-2013170194 A1 | 11/2013 |

OTHER PUBLICATIONS

"Considerations on UE Assistance Information", ZTE, 3GPP Draft; R2-121252 Considerations on UE Assistance Information, 3rd Generation Partnership Project (3GPP), Mobile Competence Centre; 650; Route Des Lucioles; F-06921 Sophia-Antipolis Cedex; France, vol. RAN WG2, No. Jeju, Korea, (Aug. 19, 2012).

"Managing Background Data Traffic in Mobile Devices", Retrieved from the Internet: <URL:http://www.qualcomm.com/media/documents/files/managing-background-data-traffic-in-mobile-devices.pdf>, (Jan. 30, 2012).

"Russian Federation Application Serial No. 2014141602. Office Action mailed Dec. 2, 2015", With English translation, 9 pgs.

"International Application Serial No. PCT/US2013/040618, International Search Report mailed Aug. 23, 2013", 3 pgs.

"International Application Serial No. PCT/US2013/040618, Written Opinion mailed Aug. 23, 2013", 5 pgs.

"Australian Application Serial No. 2013259165, Response filed Dec. 23, 2015 to Subsequent Examiners Report mailed Dec. 15, 2015", With English translation of claims, 14 pgs.

"Australian Application Serial No. 2013259165, Subsequent Examiners Report mailed Dec. 15, 2015", 2 pgs.

"Canadian Application Serial No. 2,871,107, Office Action mailed Jan. 8, 2016", 3 pgs.

"Considerations on UE Assistance Information", ZTE, 3GPP Draft; R2-121252 Considerations on UE Assistance Information, 3rd Generation Partnership Project, (3GPP), Mobile Competence Centre; 650; Route Des Lucioles; F-06921 Sophia-Antipolis Cedex; France, vol. RAN WG2, No. Jeju, Korea, (Mar. 19, 2012).

"European Application Serial No. 13787502.7, Extended European Search Report mailed Dec. 18, 2015", 12 pgs.

"Japanese Application Serial No. 2015-511773, Response filed Jan. 20, 2016 to Office Action mailed Oct. 20, 2015", 17 pgs.

"Managing Background Data Traffic in Mobile Devices", Retrieved from the Internet: <URL:http://www.qualcomm.com/media/documents/files/managing-background-data-traffic-in-mobile-devices.pdf>, Jan. 30, 2012.

"Russian Federation Application Serial No. 2014141602, Office Action mailed Dec. 2, 2015", With English translation, 9 pgs.

"International Application Serial No. PCT/US2013/040618, International Preliminary Report on Patentability mailed Nov. 20, 2014", 7 pgs.

"A Framework for Management of Background Traffic UEs", Research In Motion UK Limited, 3GPP TSG-RAN WG2#77bis R2-121609, [Online] retrieved from the internet: <URL:http://www.3gpp.org/ftp/tsg_ran/WG2_RL2/TSGR2_77bis/Docs/R2-121609.zip>, (Mar. 30, 2012).

"Japanese Application Serial No. 2015-511773, Office Action mailed Oct. 20, 2015", 5 pgs.

"Solutions to decrease signaling overhead in R11 eDDA", CMCC, CATT, 3GPP TSG-RAN WG2#77bis R2-121134, [Online] retrieved from the Internet: <URL:http://www.3gpp.org/ftp/tsg_ran/WG2_RL2/TSGR2_77bis/Docs/R2-121134.zip>, (Mar. 30, 2012).

* cited by examiner

| Field | Description |
|---|---|
| Background Traffic Classification Type (BTCT) (2 bits) | 00 = based on the new bit in the IP header<br>01 = based on port number and protocol<br>10 = based on time<br>11 = Reserved for future use |
| NewBitInfo (6 bits)/<br>BTCP (22 bits)/<br>BATP (6 bits) | When BTCT = 00<br>This field is 6 bits<br>Leftmost 3 bits = Represent bit number in the IP header Type of Service field<br>Next 2 bits = Reserved<br>Rightmost 1 bit = indicates what value of above bit in ToS of IP header says that traffic is background traffic<br>For example when the rightmost bit = 1, it means the traffic is background when aobve bit in ToS of IP Header = 1<br><br>When BTCT = 01<br>This field is 22 bits<br>Leftmost 9 bits = source port number<br>Next 9 bits = destination port number<br>Remaining Rightmost 4 bits = protocol type<br><br>When BTCT = 10<br>This field is 22 bits<br>Leftmost 11 bits = start time (in seconds)<br>Next 11 bits = end time (in seconds) |
| De-Prioritized (1 bit) | 1 = De-Prioritize background traffic whenever there is other normal/active traffic<br>0 = Do not De-Prioritize background traffic |
| Hold-Time (6 bits) | Specifies Maximum Time for which eNodeB can wait to wake up user after getting DL packet for the same user.<br>111111 may represent infinite hold time. |
| R | Reserved |

Fig. 8

METHOD TO IDENTIFY AND DIFFERENTIATE BACKGROUND TRAFFIC

This application is a U.S. National Stage Filing under 35 U.S.C. 371 from International Application No. PCT/US2013/040618, filed May 10, 2013, and published in English as WO 2013/070194 on Nov. 14, 2013, which claims the benefit of priority to U.S. Provisional Patent Application Ser. No. 61/646,223, filed May 11, 2012, all of which are incorporated herein by reference in their entireties.

BACKGROUND

Background traffic occurs when a computing device sends and receives data-files in the background. The packets/traffic generated without the user involvement or that the user is not necessarily expecting is generally called background traffic. Emerging applications, such as social applications (e.g., Facebook, Twitter, etc.) also generate background traffic on top of the traffic that is generated with the user involvement. Background traffic is one of the classical data communication schemes characterized by the destination not expecting the data within a certain time. Examples include background delivery of E-mails, SMS, and download of databases and reception of measurement records. With regard to social media, background data includes Facebook and Twitter updates while the user is not actively using the device. Due to the social nature, background traffic generated by social applications, etc. is very frequent and has smaller packets.

Two major issues associated with background traffic are: (a) background traffic makes the device to receive/transmit this traffic when it is generated and does not allow the device to be in low power mode continuously for a long period of time, hence, consumes battery power unnecessarily, (b) background traffic makes the device to come out of the low power mode and make connectivity to the network frequently to receive/transmit the background traffic, hence, adds substantial air interface signaling overhead.

Two major problem areas include determining how to identify background traffic and how to differentiate background traffic from regular traffic.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 8 shows a table providing a description of the BTIDR MAC CE fields according to an embodiment.

DETAILED DESCRIPTION

Figure 1:
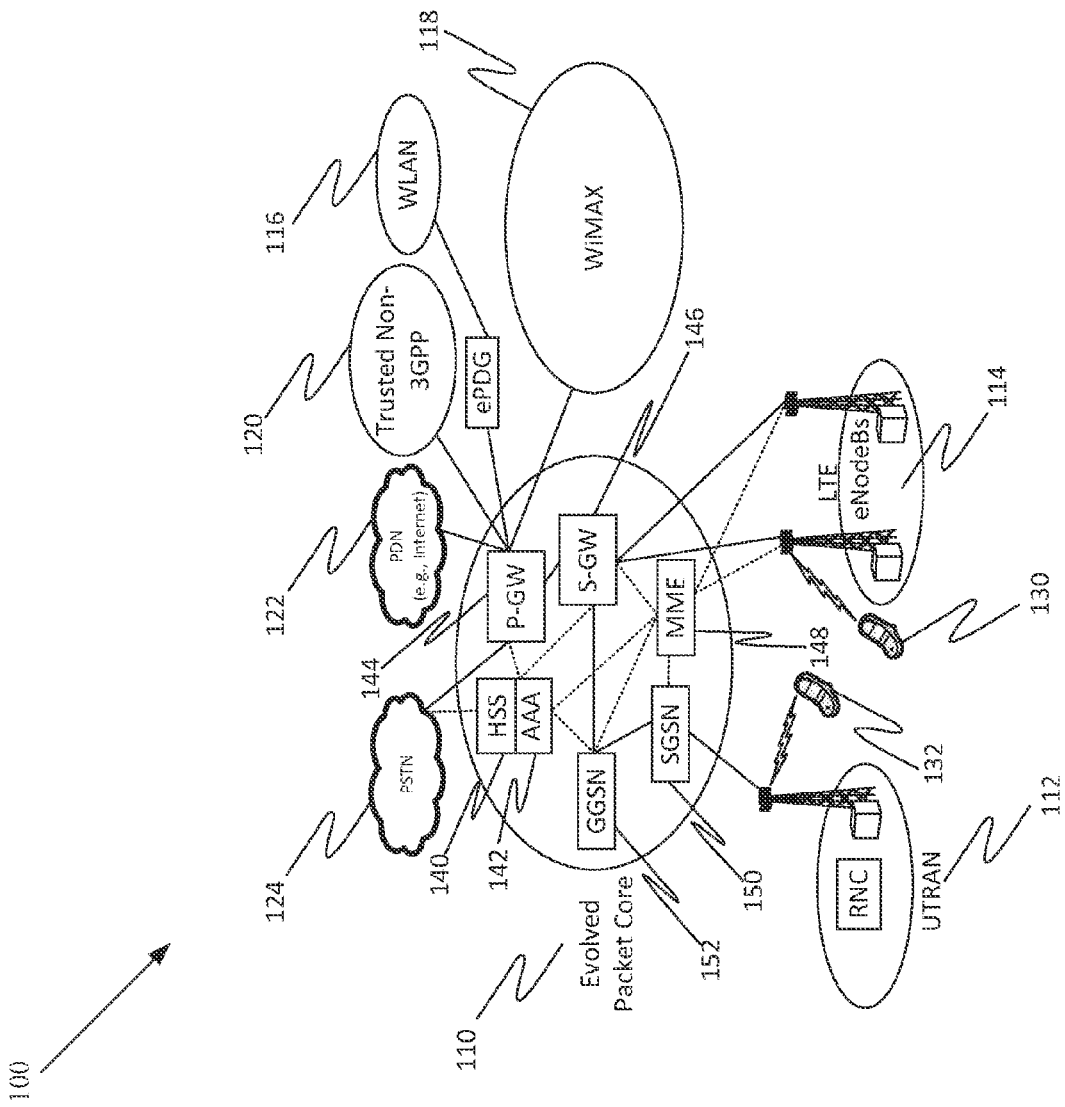
FIG. 1 illustrates a block diagram of a communications network according to an embodiment.

FIG. 1 illustrates a block diagram of a communications network 100 according to an embodiment. In FIG. 1, an evolved packet core 110 is coupled to Universal Terrestrial Radio Access Network (UTRAN) 112, eNnodeBs 114 in an LTE network. WLAN 116, WiMAX 118, Non-3GPP (3rd Generation Partnership Project) networks 120, packet data networks 122, e.g., Internet, and public switched telephone network (PSTN) 124. The PSTN 124 is the network of public circuit-switched telephone networks and includes telephone lines, fiber optic cables, microwave transmission links, cellular networks, communications satellites, and undersea telephone cables, all inter-connected by switching centers. The PSTN 124 thus allows any telephone in the world to communicate with any other.

User equipment (UE) 130, 132 may access network services via eNodeBs (evolved nodeBs) 114 and UTRAN 112, respectively. UE 130, 132 may include many different types of devices ranging from simple mobile telephones to digital televisions. The evolved packet core 110 may support a mix of radio transmission technologies including GSM, WCDMA, and UMTS LTE wide radio channels. Moreover, the evolved packet core 110 uses an IP packet system, which can access other types of networks, such as the PSTN 124, PDN 122, WLAN 116, WiMAX 118, trusted non-3GPP 120 networks, etc. through the use of gateway (GW) devices. The evolved packet core 110 may include a home subscriber server (HSS) 140, an authentication, authorization and accounting (AAA) device 142, a packet gateway (P-GW) 144, a serving gateway (S-GW) 146, a mobility management entity (MME) 148, a serving GPRS support node (SGSN) 150 and a gateway GPRS support node (GGSN) 152. General packet radio service (GPRS) is used to support packet oriented mobile data service on the 2G and 3G cellular communication systems. The UTRAN 112 includes a NodeB 160 and a radio network controller (RNC) 162. The UTRAN 112 is coupled to the evolved packet core 110 via the RNC 162 and the SGSN 150. The eNodeBs 114 are coupled to the MME 148 in the evolved packet core 110. The WiMAX network 118 is coupled to the evolved packet core 110 via the P-GW 144. The P-GW 144 also couples the evolved packet core 110 to the WLAN 116, the trusted non-3GPP network 120, the Internet (or other packet data network) 122 and the PSTN 124.

Figure 2:
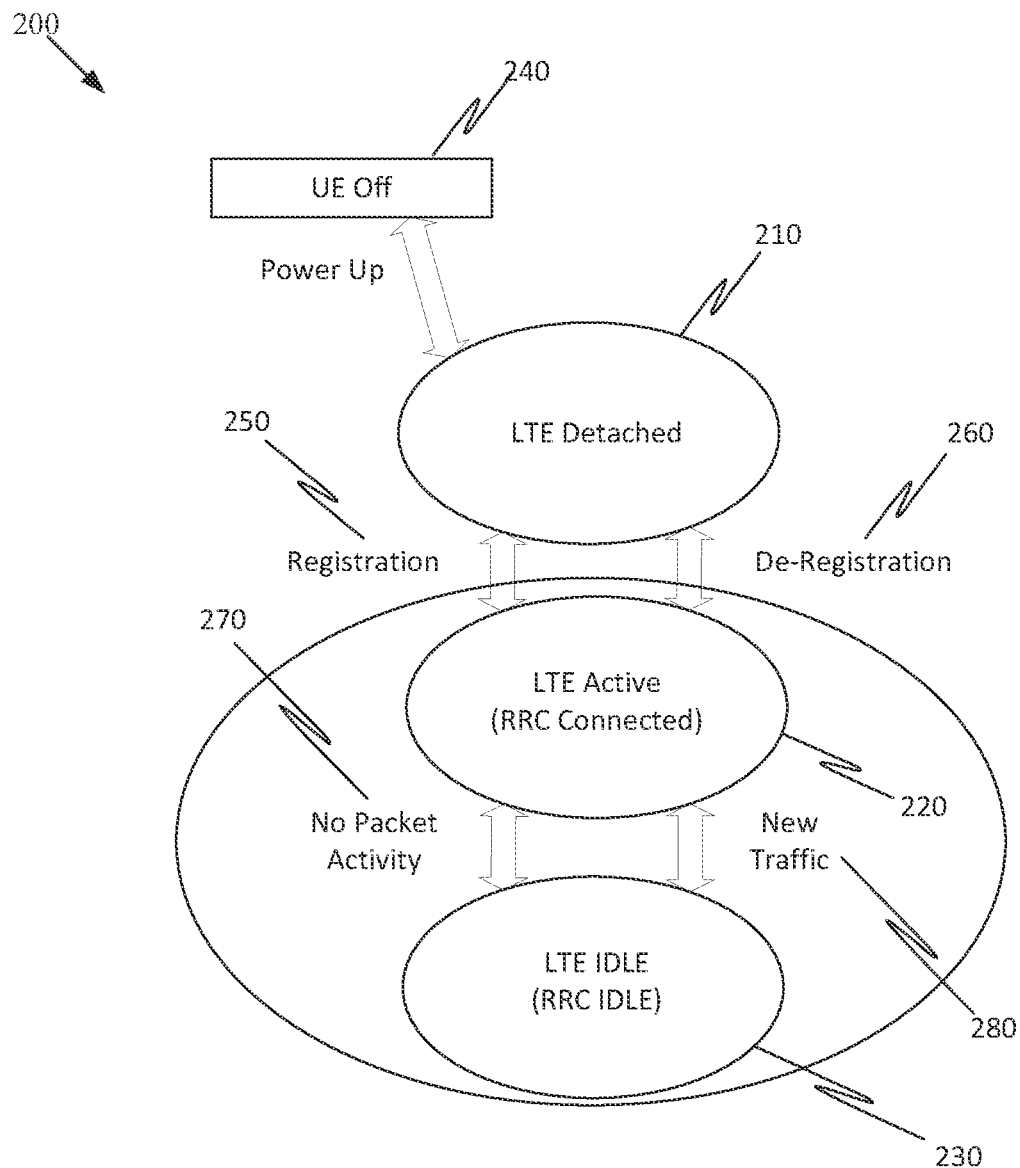
FIG. 2 illustrates states of UE according to an embodiment.

FIG. 2 illustrates states of UE 200 according to an embodiment. As shown in FIG. 2, UE may stay in DETACHED 210, ACTIVE 220 and IDLE 230 states. The UE may transition from an OFF state 240 to the DETACHED state 210. The DETACHED state 210 represents the time when UE is not registered with network and hence not known to the network. The ACTIVE state 210 occurs when the UE registers 250 with the network to connect to radio resource control (RRC), wherein the UE establishes radio bearers (signaling and data radio bearers) with a serving eNodeB in order to transmit/receive uplink/downlink data and control messages. When the UE is in the ACTIVE state 220, the UE is known to the network at the cell level. The ACTIVE state 220 is where UE is most active and all data packet transmission related to the UE takes place. When there is no data activity 270 for a long duration, UE releases radio bearers and enters IDLE state 230. In the IDLE state 230, the UE is known to the network at a tracking area level and can be reached by the network through paging messages. Whenever, there is uplink or downlink data related to the UE, the user first moves to the ACTIVE state 220 to process new data 280. The UE is again connected to RRC in order to send or receive the data. The UE may de-register 260 with the network to transition to the DETACHED state 210.

Figure 3:
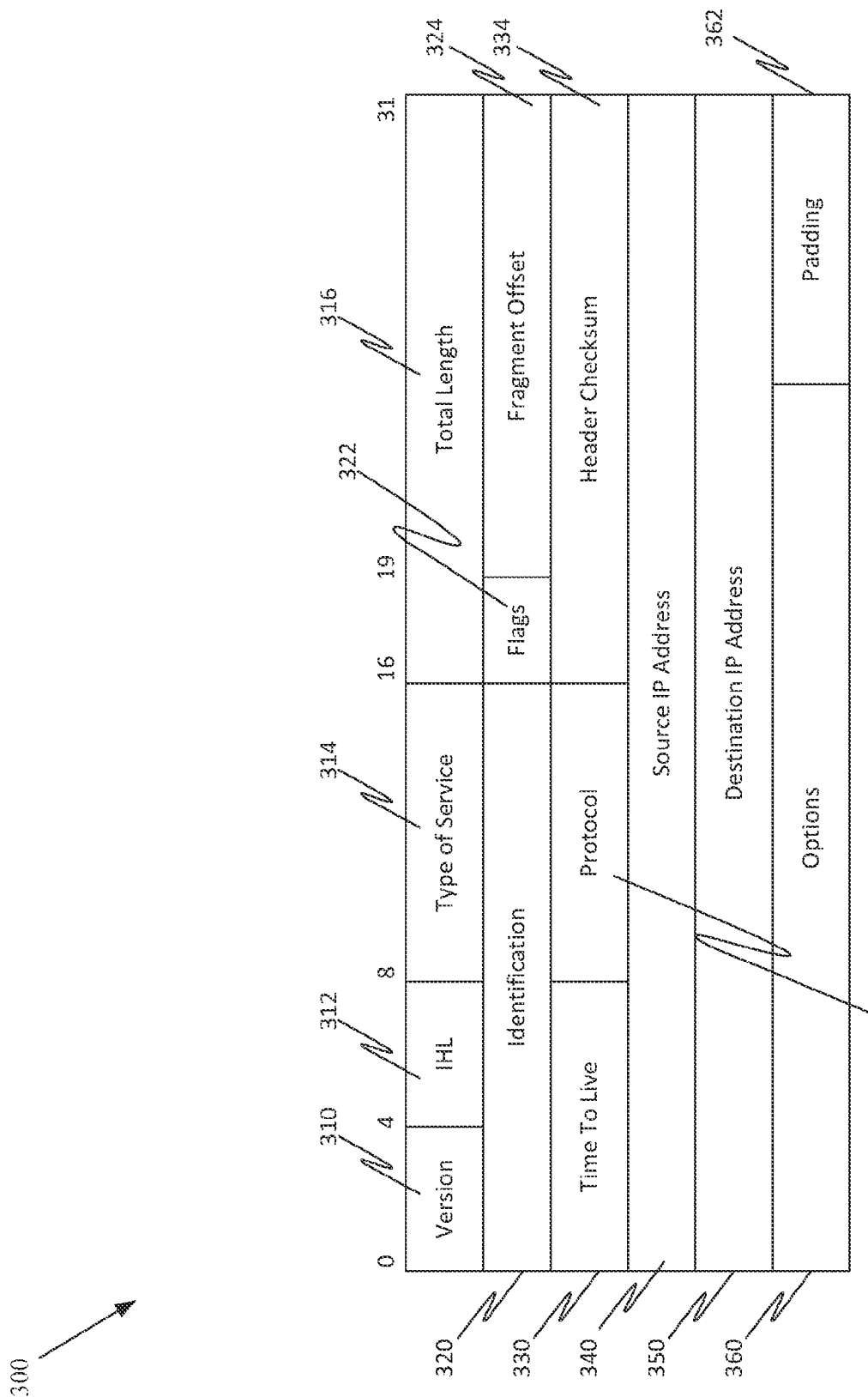
FIG. 3 illustrates an IP header according to an embodiment.

FIG. 3 illustrates an IP header 300 according to an embodiment. The IP header includes a Version field 310, an IHL field 312, a Type of Service field 314, a Total Length field 316, an Identification field 320, Flag fields 322, a Fragment Offset field 324, a Time To Live field 330, a Protocol field 332, a Header Checksum field 334, a Source IP Address field 340, a Destination IP Address field 350, a field for Options 360 and a field for Padding 362.

Figure 4:
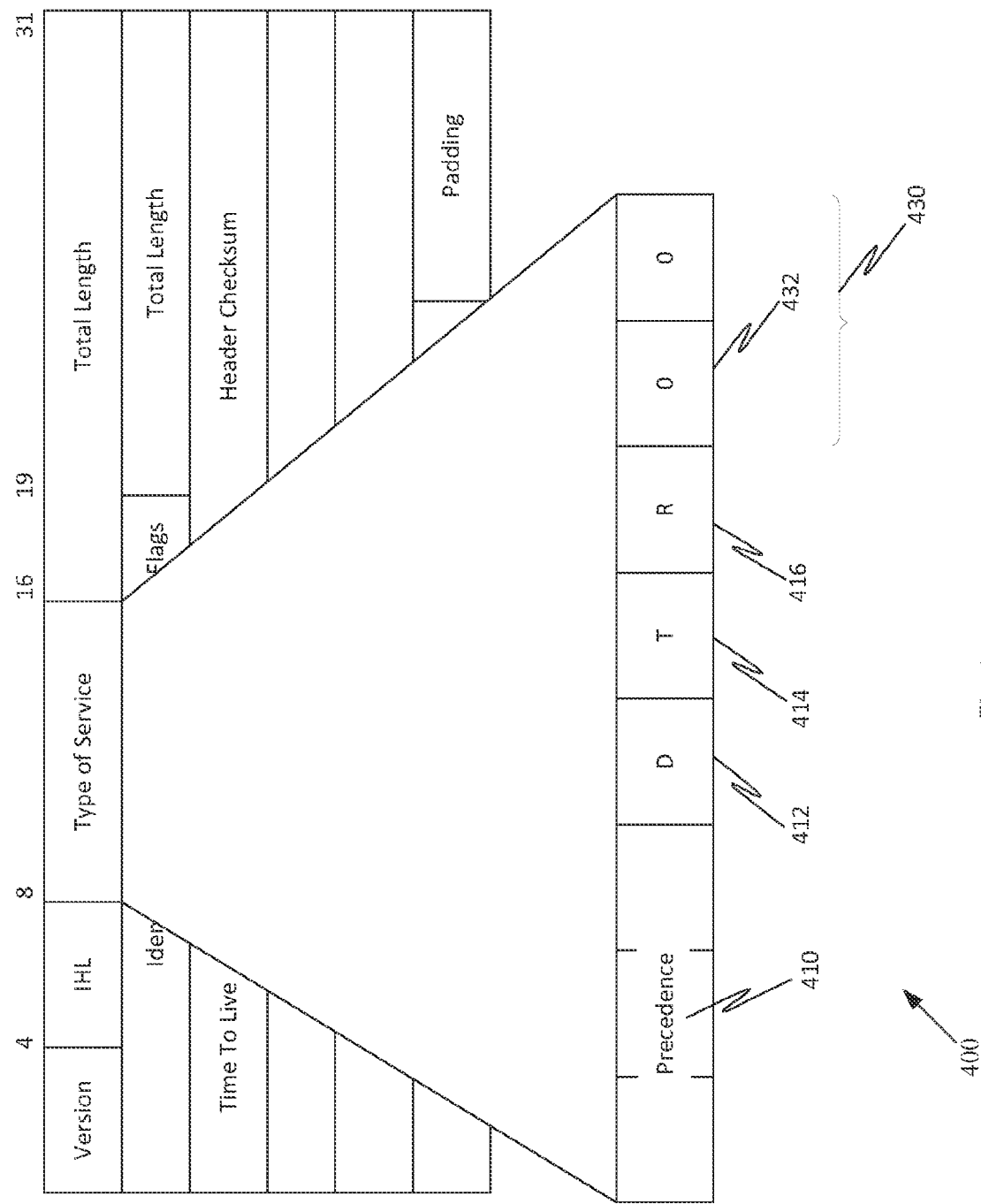
FIG. 4 illustrates a more detailed view of the Type of Service IP header field according to an embodiment.

FIG. 4 illustrates a more detailed view of the Type of Service IP header field 400 according to an embodiment. The Type of Service IP header field 400 includes Bits 0-2 to indicate Precedence 410, Bit 3 to indicate Delay 412, e.g., Normal Delay when set to 0 and Low Delay 414 when set to 1, Bit 4 to indicate Throughput 414, e.g., Normal Throughput when set to 0 and High Throughput when set to 1, and Bit 5 to indicate Reliability 416, e.g., Normal Reliability when set to 0 and High Reliability when set to 1. Bits 6-7 430 are reserved for future use, but herein, according to an embodiment, bit 6 432 may be used to identify background traffic.

However, according to embodiments described herein, several methods for providing an indication to identify and/or differentiate background traffic may be used. Applications may let the device know of the background traffic via an application programming interface (API) and/or the device may perform intelligent prediction of background traffic.

There are two methods for applications to indicate to the device the type of traffic via an application programming interface (API). As mentioned above, Bits 6-7 430 of the Type of Service IP header field 400 are reserved for future use. However, one of these bits can be harvested to identify background traffic. For example, bit 6 432 may be used to identify background traffic by using bit 6 432 to indicate normal packet/traffic when set to 0 and to indicate background packet/traffic when set to 1. This information may be passed to the device via an API, and each packet may carry the information provided by bit 6 432. A UE may thus identify the type of packet/traffic by IP packet header information.

Figure 5:
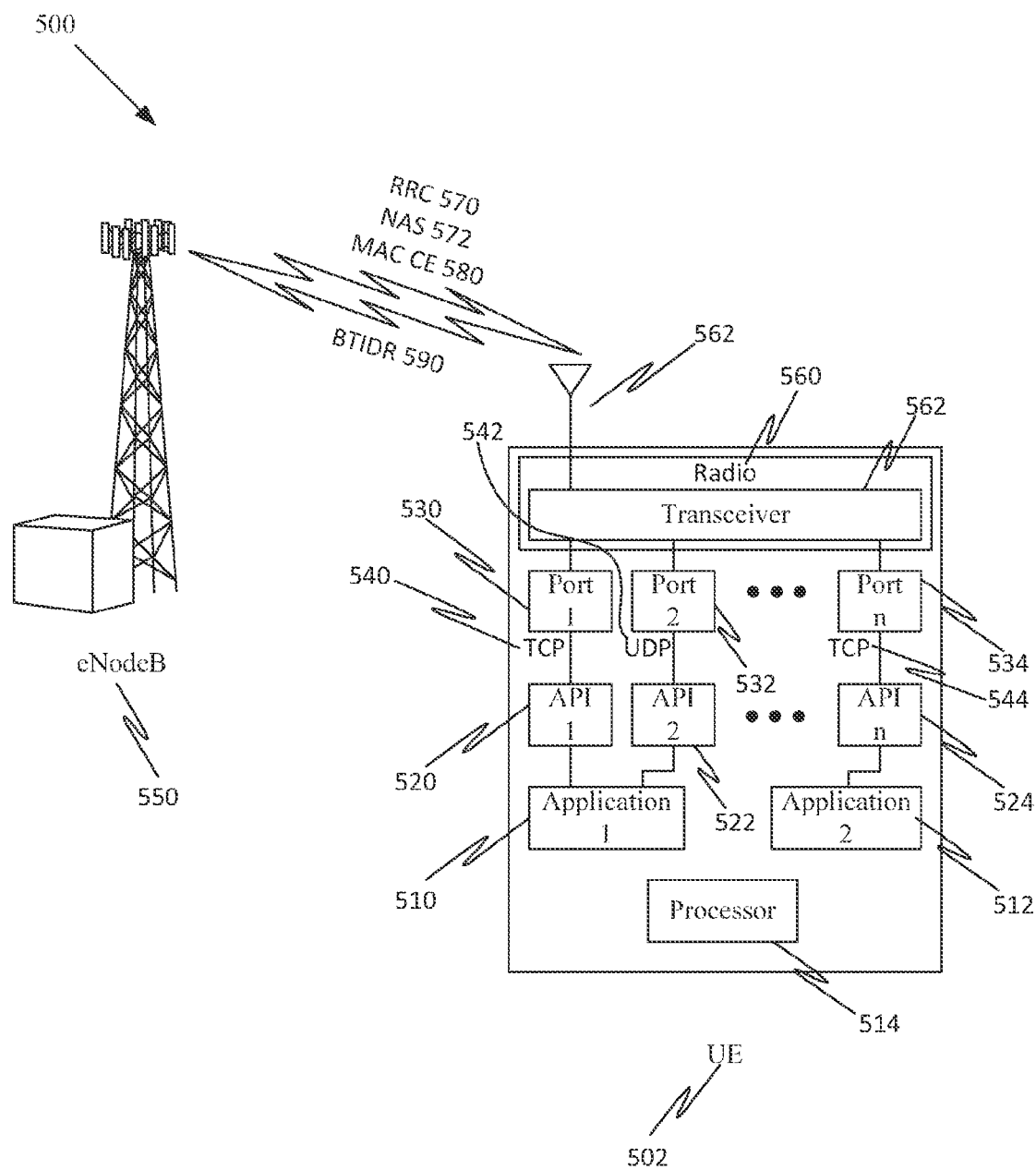
FIG. 5 illustrates a system wherein a second method associated with applications is used to indicate to a device the type of traffic via an API according to an embodiment.

FIG. 5 illustrates a system 500 wherein a second method associated with applications is used to indicate to a device the type of traffic via an API according to an embodiment. In FIG. 5, a first application 510 accessing API 1 520 may identify, to the device, the port number, e.g., Port 1 530, and the protocol type, TCP 540, that is sending and/or receiving background traffic. In FIG. 5, the first application 510 may also access API 2 522.

The first application 510 accessing API 1 520 may thus identify, to the device, whether Port 2 532 and protocol type, UDP 542 is associated with transmission and/or receipt of background traffic. In case there are multiple applications running on the UE 502, e.g., first application 510 and second application 512, the UE 502 may enter a low power mode only for the duration when both the first application 510 and second application 512, including Port 1 530, Port 2 532 and Port n 534, are sending background traffic. Port n 534 may also be identified to be using a TCP protocol 544 for background traffic. However, even in this duration of time, the UE 502 may be benefitted from background traffic identification and differentiation by requesting de-prioritization of background traffic to the eNodeB 550. Radio 560 includes, among other components, a transceiver 562 transmits and receives traffic via antenna 562. First application 510 and second application 512, as well as the identification and differentiation of background traffic, are implemented by processor 514. Processor 514 provides the indication for identifying and differentiating background traffic. Radio 560 may transition between an ACTIVE state, an IDLE state, DETACHED state and POWERED-OFF state. The IDLE state may be entered when the device is unattended, when the screen is turned off, etc. Accordingly, the radio 560 between device/UE 502 and BS/eNode B 550 transitions to the IDLE state.

Figure 6:
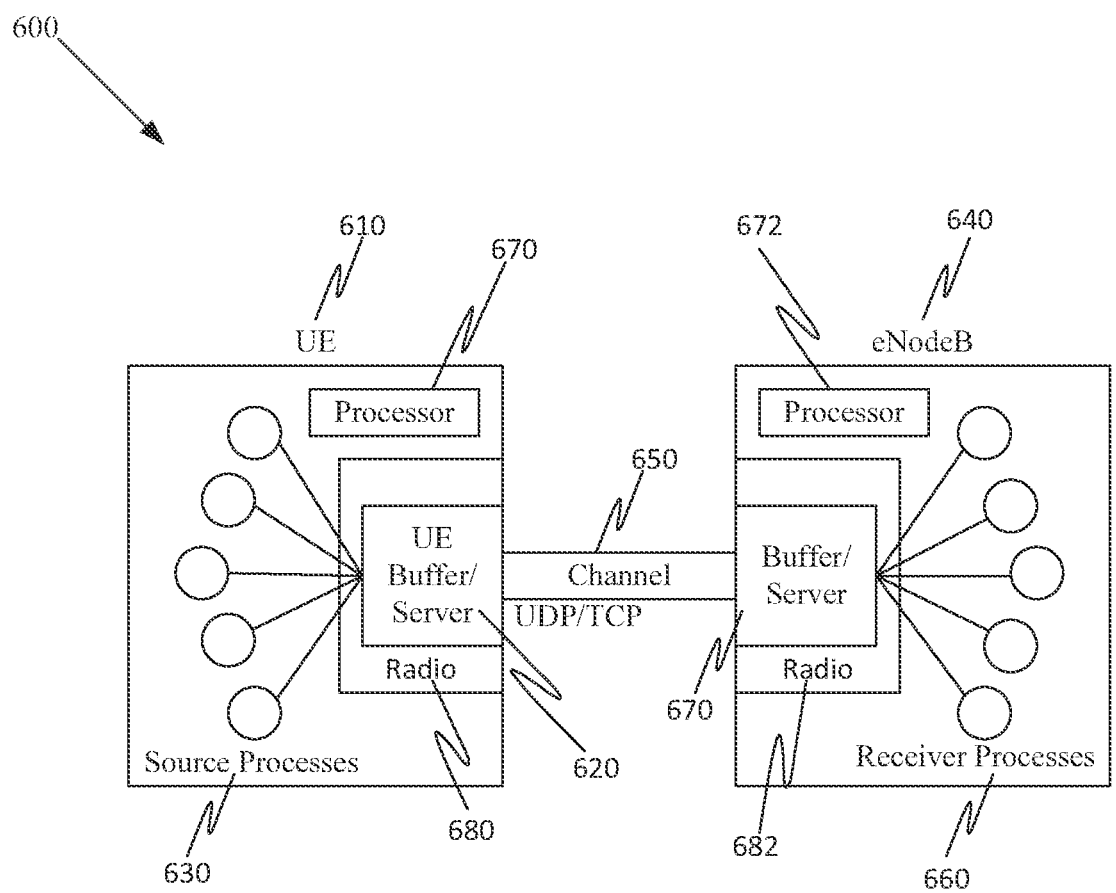
FIG. 6 illustrates a system wherein an uplink buffer is provided for use when identifying background traffic according to an embodiment.

FIG. 6 illustrates a system wherein an uplink buffer is provided for use when identifying background traffic according to an embodiment. The user equipment 610 may perform intelligent prediction of background traffic. The UE 610 includes a UE uplink buffer/server 620. Source processes 630 provide/receive packets over a channel 640 from the UE uplink buffer/server 620. The user equipment 610 may receive packets from an eNodeB 640 in the UE uplink buffer/server 620 over channel 650. The eNodeB 640 includes receiver processes 660, a buffer/server 670 for buffering received/sent packets and a radio 682 for receiving and transmitting the packets. The UE 610 includes a processor 670 for performing operations of the UE 610 and the eNodeB 640 includes a processor 672 for performing operations of the eNodeB 640.

When the UE uplink buffer/server 620 receives packets, the UE 610 may categorize the received packets. The packets received at the UE uplink buffer/server 620 are stored when the UE is in unattended mode, i.e., there is no user involvement at the UE 610, e.g., when the screen and/or when the radio 680 of is turned off. After background traffic has been identified, the UE 610 must be instructed how to differentiate the background traffic. The UE 610 identifies the background traffic in the UE uplink buffer/server 620 and treats the background traffic appropriately. For example, when background traffic comes to UE uplink buffer/server 620, the UE does not wake up from low power mode to send this background traffic. Instead, the UE 610 may keep the background traffic in the UE uplink buffer/server 620 for up to a certain period of time or till the UE 610 wakes up again and the radio 680 is turned on.

In the downlink, a mechanism for the eNodeB (base station) to identify and differentiate the background traffic is provided. As described above with reference to FIG. 4, a UE may provide information to an eNodeB regarding how to identify the background traffic based on the use of previously reserved bits 430 in the Type of Service field of the IP header 400, e.g., bit 6 432. Alternatively, as described above with reference to FIG. 5, the UE 502 may provide the port number 530-534 and protocol type 540-544 from UE 502 to the eNodeB 550 or the start/end time of background traffic.

Figure 7:
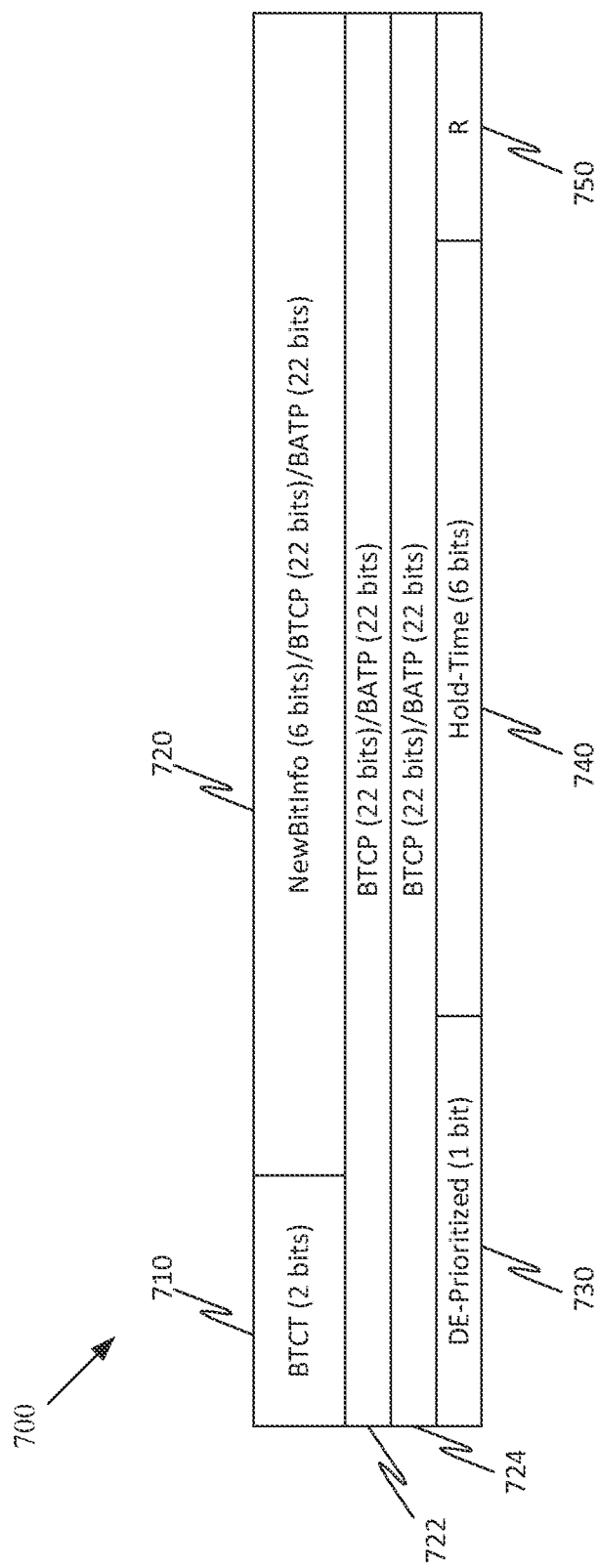
FIG. 7 illustrates a Background Traffic Identification and Differentiation Rules (BTIDR) media access control (MAC) control element (CE) according to an embodiment.

FIG. 7 illustrates a Background Traffic Identification and Differentiation Rules (BTIDR) media access control (MAC) control element (CE) 700 according to an embodiment. The MAC CE is one type of information element that may be used to provide an identification to identify and/or differentiate background traffic according to an embodiment. In FIG. 7, a Background Traffic Classification Type (BTCT) field 710 includes 2 bits. A NewBitInfo field 720 may be 6 bits or 22 bits. A De-Prioritized field 730 is 1 bit and a Hold-Time field 740 is 6 bits. A Reserved field 750 is provided for use of bits in the BTIDR MAC CE 700. A first BTCP/BATP field 722 and a second BTCP/BATP field 724 are also provided.

Referring again to FIG. 5, communication between UE 502 and the network, e.g., an eNodeB 550, may include signaling message, e.g., RRC 570 or NAS 572 messages and control command exchange between UE 502 and an eNodeB 550, i.e., not the data traffic. In UMTS, RRC 570 and NAS 572 messages function as communication between UE 502 and the eNodeB 550. However, in LTE, there are several communication paths at the MAC layer. The MAC control element (MAC CE) 580 may be used to carry special control information.

FIG. 8 shows a table providing a description of the BTIDR MAC CE fields 800 according to an embodiment. The BTIDR MAC CE fields 800 include Background Traffic Classification Type (BTCT) 810, NewBitInfo 820, Background Traffic Classification Parameters (BTCP) 822, and Background Activity Time Parameters (BATP) 824. A 1 bit De-prioritized field 830, a 6 bit Hold-Time field 832 and a reserved field 834. The Background Traffic Classification Type (BTCT) field 810 is 2 bits and may be 00 to indicate the identification of background traffic is based on the new bit in the IP header 840, 01 to indicate the identification of background traffic is based on port number and protocol 842, 10 to indicate the identification of background traffic is based on time 844 and 11 is assigned to a reserved field 846.

When BTCT is equal to 00 850, the BATP field is 6 bits, wherein the leftmost 3 bits represent the bit number in the IP header Type of service field. The next 2 bits are reserved. The rightmost 1 bit is used to indicate what value of above bit in Type of Service field of IP header indicates that the traffic is background traffic. For example when this rightmost bit=1, the traffic is background traffic when above bit in Type of Service field of IP header=1.

When BTCT is equal to 01 860, the BTCP field is 22 bits, wherein the leftmost 9 bits identify the source port number, the next 9 bits identify the destination port number and the remaining rightmost 4 bits identify the protocol type.

When BTCT is equal to 10 870, the BTCP field is 22 bits. The leftmost 11 bits identify the =start time (in seconds) and the next 11 bits identify the end time (in seconds).

The De-Prioritized field 830 is 1 bit. When the De-Prioritized field 830 is set to 8880, background traffic is de-prioritized whenever there is other normalactive traffic. When the De-Prioritized field 830 is set to 8882, the background traffic is not deprioritized. The Hold-Time field 832 is 6 bits. The Hold-Time field 832 specifies a maximum time for which the eNodeB can wait to wake up after getting DL packet for the same user 890. 111111 may represent infinite hold-time. The R field indicates a Reserved field 892.

Referring to both FIG. 5 and FIG. 8, the MAC CE information may be sent from the UE 502 to eNodeB 550 for identifying background traffic. The length of the MAC CE field 800 is fixed. The actual length of the MAC CE 800 will be either 4 bytes or 2 bytes based on implementation. NewBitInfo (6 bits) 820/BTCP (22 bits) 822/BATP (6 bits) 824 fields will contain only one of the NewBitInfo (6 bits) 820, BTCP (22 bits) 822 and BATP (22 bits) 824 parameters. The UE 502 may tell the eNodeB 550 how to differentiate/treat the background traffic, e.g., if the UE 502 is in IDLE mode the UE 502 does not need to be brought out of IDLE mode for the eNodeB 550 to send this background traffic. The UE 502 may also specify a maximum time period that the eNodeB 550 may hold the background traffic at a downlink buffer at the eNodeB 550 before the eNodeB 550 wakes up the UE 502 to send these packets. For example if Discontinuous Reception (DRX) functionality is enabled at the UE 502, the eNodeB 550 will wake up the UE 502 during the last DRX ON duration, which occurs before the end of specified maximum packet holding time duration.

The UE 502 and the eNodeB 550 negotiate phases in which data transfer occurs. During other times the UE 502 turns its receiver off and enters a low power state. The UE 502 will wake up during scheduled periods to look for its messages. UEs that are in idle mode may monitor the Physical Downlink Control Channel (PDCCH) for Paging-Radio Network Temporary Identity (P-RNTI), which is used for paging to receive paging messages from the eNodeB 550. The UE 502 needs to monitor the PDCCH only at certain specific paging occasions set by the UE 502, i.e. only at specific subframe in a specific radio frame. At other times, the UE 502 may go to sleep mode to save battery power. Note that a really long time period could mean that the eNodeB 550 does not need to wake up the device to convey the background traffic. Furthermore, the UE 502 also could specify a rule regarding how the background traffic can be treated, e.g., de-prioritized, when there is normal traffic present for the same UE/flow in the connected mode.

BTIDR 590 may be sent to eNodeB 550 from UE 502 by including information in one of the information elements (IEs) of uplink DCCH (dedicated control channel) messages. DCCH is the logical channel assigned to UE 502 when the UE 502 is allocated an RRC connection 570. UL-DCCH Messages include UEinformationResponse-r9, RCConnectionReconfigurationComplete, RCConnectionReestablishmentComplete, and RRCConnectionSetupComplete messages. IEs sent via RRC 570, NAS 572 or MAC CE 580, e.g., UE-BTIDR-r11, may include BTIDR information. UE-BTIDR-r11 can be defined as one of the release 11 noncritical extensions of existing IEs.

For example UE BTIDR-r11 may be incorporated in UEinformationResponse message. The UEinformationResponse message may be used by the UE 502 to transfer request information. The description of UE-BTIDR-r11 fields is similar to that of the fields described above with reference to BTIDR shown in FIG. 8. Similarly, UE-BTIDR-r11 can be integrated as a noncritical extension in other UL-DCCH Messages, such as RCConnectionReconfigurationComplete, RCConnectionReestablishmentComplete, and RRCConnectionSetupComplete.

Figure 9:
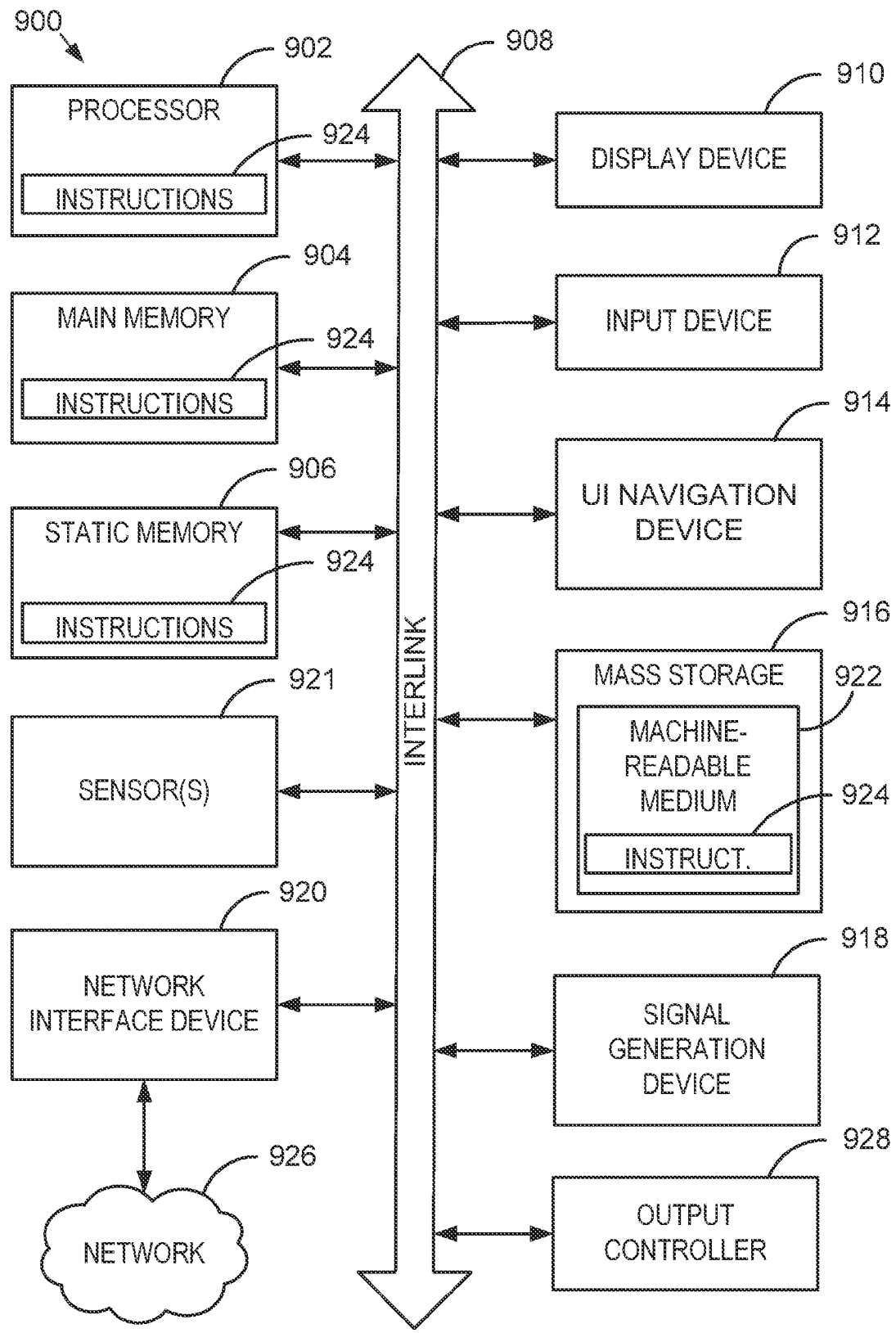
FIG. 9 illustrates a block diagram of an example machine to identify and differentiate background traffic according to an embodiment

FIG. 9 illustrates a block diagram of an example machine 900 to identify and differentiate background traffic according to an embodiment upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine and/or a client machine in server-client network environments. In an example, the machine 900 may act as a peer machine in peer-to-peer (P2P) (or other distributed) network environment. The machine 900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 902 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 902 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 900 may include a hardware processor 902 (e.g., a central processing unit (CPU), a graphics processing unit (GPU), a hardware processor core, or any combination thereof), a main memory 904 and a static memory 906, at least some of which may communicate with others via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 may include at least one machine readable medium 922 on which is stored one or more sets of data structures or instructions 924 (e.g., software) embodying or utilized by any one or more of the techniques or functions described herein. The instructions 924 may also reside, at least partially, additional machine readable memories such as main memory 904, static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) that configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Additional Notes & Examples

Example 1 includes subject matter (such as a device, apparatus, client or system) including a radio including a transceiver arranged to wirelessly transmit and receive packets over a communications network and a processor, coupled to the transceiver, the processor arranged to provide an indication identifying packets associated with background traffic.

Example 2 may optionally include the subject matter of Example 1, wherein the indication identifying packets associated with background traffic comprises a bit in a header of a packet, wherein the bit is set in a first state to indicate the packet is associated with background traffic and the bit is set in a second state to indicate the packet is associated with active traffic.

Example 3 may optionally include the subject matter of Example 1-2, wherein the indication identifying packets associated with background traffic is provide by an applications via an application programming interface (API).

Example 4 may optionally include the subject matter of Example 1-3, wherein the indication identifying packets associated with background traffic comprises an identification of a port number and a protocol type associated with background traffic, the identification provided to an eNodeB.

Example 5 may optionally include the subject matter of Example 1-4, wherein the indication identifying packets associated with background traffic is provide by an applications via an application programming interface (API).

Example 6 may optionally include the subject matter of Example 1-5, wherein the processor is arranged to perform intelligent prediction of background traffic, the processor categorizing arriving packets as background packets when the radio is in an idle state.

Example 7 may optionally include the subject matter of Example 1-6, wherein the processor transitions to an idle state only when all applications are arranged to only send background traffic, the background traffic being maintained in an uplink buffer until the processor transitions to an active state.

Example 8 may optionally include the subject matter of Example 1-7, wherein the indication identifying packets associated with background traffic comprises a start time indicating when background traffic starts and an end time indicating when background traffic ends, the indication being provided to an eNodeB.

Example 9 may optionally include the subject matter of Example 1-8, wherein the processor is further arranged to provide an indication for differentiating background traffic.

Example 10 may optionally include the subject matter of Example 1-9, wherein the indication for differentiating background traffic comprises an information element provided by dedicated signaling, wherein the information element includes a de-prioritization bit, the de-prioritization bit being set in a first state to signal de-prioritization of background traffic when active traffic is detected and set in a second state to signal not to de-prioritize background traffic.

Example 11 may optionally include the subject matter of Example 1-10, wherein the information element comprises a field for setting a maximum hold time informing a node receiving the information element of a maximum time to wait before waking the processor.

Example 12 may optionally include the subject matter of Example 1-11, wherein the information element comprises a media access control (MAC) control element (CE).

Example 13 may optionally include the subject matter of Example 1-12, wherein the information element comprises a radio resource control (RRC) message.

Example 14 may optionally include the subject matter of Example 1-13, wherein an enhanced base station (eNodeB) includes a buffer for maintaining received packets prior to processing and for maintaining packets prior to transmission and a processor, coupled to the buffer, the processor arranged to receive an indication identifying packets associated with background traffic, the processor processing packets according to the received indication.

Example 15 may optionally include the subject matter of Example 1-14, wherein the processor is further arranged to receive an indication for differentiating background traffic.

Example 16 may optionally include the subject matter of Example 1-15, wherein the indication identifying packets associated with background traffic comprises instructions for setting a bit in a header of a packet, wherein the bit is set in a first state to indicate the packet is associated with background traffic and the bit is set in a second state to indicate the packet is associated with active traffic.

Example 17 may optionally include the subject matter of Example 1-16, wherein the indication identifying packets associated with background traffic comprises instructions for associating a port number and a protocol type associated with background traffic, the identification provided to an eNodeB.

Example 18 may optionally include the subject matter of Example 1-17, wherein the indication identifying packets associated with background traffic comprises instructions for establishing a start time associated with background traffic and an end time associated with background traffic, the indication being provided to an eNodeB.

Example 19 may include subject matter (such as a method or means for performing acts) including processing, at a user equipment, packets received and transmitted by a radio over a wireless communication channel and providing an indication to identify packets associated with background traffic.

Example 20 may optionally include the subject matter of Example 19, wherein the providing an indication to identify packets associated with background traffic comprises providing a bit in a header of a packet, wherein the bit is set in a first state to indicate the packet is associated with background traffic and the bit is set in a second state to indicate the packet is associated with active traffic.

Example 21 may optionally include the subject matter of Example 19-20, wherein the providing the indication to identify packets associated with background traffic comprises providing the indication to identify packets associated with background traffic by an application through an application programming interface (API).

Example 22 may optionally include the subject matter of Example 19-21, wherein the providing the indication identifying packets associated with background traffic comprises providing an identification of a port number and a protocol type associated with background traffic, the identification provided to an eNodeB.

Example 23 may optionally include the subject matter of Example 19-22, wherein the providing the indication identifying packets associated with background traffic comprises performing intelligent prediction of background traffic by categorizing arriving packets as background packets when the radio is in an idle state.

Example 24 may optionally include the subject matter of Example 19-23, including transitioning to an idle state only when all applications are arranged to only send background traffic, the background traffic being maintained in an uplink buffer until the processor transitions to an active state.

Example 25 may optionally include the subject matter of Example 19-24, wherein the providing the indication identifying packets associated with background traffic comprises providing a start time indicating when background traffic starts and an end time indicating when background traffic ends, the indication being provided to an eNodeB.

Example 26 may optionally include the subject matter of Example 19-25, including providing an indication for differentiating background traffic.

Example 27 may optionally include the subject matter of Example 19-26, wherein the providing the indication for differentiating background traffic comprises providing to a node an information element through dedicated signaling, wherein the information element includes a de-prioritization bit, the de-prioritization bit being set in a first state to signal de-prioritization of background traffic when active traffic is detected and set in a second state to signal not to de-prioritize background traffic.

Example 28 may include subject matter (such as means for performing acts or machine readable medium including instructions that, when executed by the machine, cause the machine to perform acts) including processing, at a user equipment, packets received and transmitted by a radio over a wireless communication channel and providing an indication to identify packets associated with background traffic.

Example 29 may optionally include the subject matter of Example 28, wherein the providing an indication to identify packets associated with background traffic comprises providing a bit in a header of a packet, wherein the bit is set in a first state to indicate the packet is associated with background traffic and the bit is set in a second state to indicate the packet is associated with active traffic.

Example 30 may optionally include the subject matter of Example 28-29, wherein the providing the indication to identify packets associated with background traffic comprises providing the indication to identify packets associated with background traffic by an application through an application programming interface (API).

Example 31 may optionally include the subject matter of Example 28-30, wherein the providing the indication identifying packets associated with background traffic comprises providing an identification of a port number and a protocol type associated with background traffic, the identification provided to an eNodeB.

Example 32 may optionally include the subject matter of Example 28-31, wherein the providing the indication identifying packets associated with background traffic comprises performing intelligent prediction of background traffic by categorizing arriving packets as background packets when the radio is in an idle state.

Example 33 may optionally include the subject matter of Example 28-32, including transitioning to an idle state only when all applications are arranged to only send background traffic, the background traffic being maintained in an uplink buffer until the processor transitions to an active state.

Example 34 may optionally include the subject matter of Example 28-33, wherein the providing the indication identifying packets associated with background traffic comprises providing a start time indicating when background traffic starts and an end time indicating when background traffic ends, the indication being provided to an eNodeB.

Example 35 may optionally include the subject matter of Example 28-34, including providing an indication for differentiating background traffic.

Example 36 may optionally include the subject matter of Example 28-35, wherein the providing the indication for differentiating background traffic comprises providing to a node an information element through dedicated signaling, wherein the information element includes a de-prioritization bit, the de-prioritization bit being set in a first state to signal de-prioritization of background traffic when active traffic is detected and set in a second state to signal not to de-prioritize background traffic.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A user equipment, comprising:
a radio including a transceiver arranged to:
wirelessly transmit and receive packets to and from an eNodeB; and
execute a plurality of operation states for the transceiver, including an idle state and an active state; and
a processor, coupled to the transceiver, the processor arranged to provide, for transmission to the eNodeB, an indication identifying packets associated with background traffic for the eNodeB to hold when the radio is executing the idle state for the transceiver, and for identification of packets associated with active traffic for the eNodeB to send to the user equipment with a wake-up signal for the transceiver to transition to the active state when the radio is executing the idle state for the transceiver.

2. The user equipment of claim 1, wherein the indication identifying packets associated with background traffic comprises a bit in a header of a packet, wherein the bit is set in a first state to indicate the packet is associated with background traffic and the bit is set in a second state to indicate the packet is associated with active traffic.

3. The user equipment of claim 2, wherein the indication identifying packets associated with background traffic is provided by one or more applications via one or more application programming interfaces (APIs).

4. The user equipment of claim 1, wherein the indication identifying packets associated with background traffic comprises an identification of a port number and a protocol type associated with background traffic.

5. The user equipment of claim 4, wherein the indication identifying packets associated with background traffic is provided by one or more applications via one or more application programming interfaces (APIs).

6. The user equipment of claim 1, wherein the processor is arranged to perform intelligent prediction of background traffic, the processor categorizing arriving packets as background packets when the radio is executing the idle state for the transceiver.

7. The user equipment of claim 1, wherein the radio is to execute the idle state when all applications are arranged to only send background traffic, the background traffic being maintained in an uplink buffer until the radio transitions the transceiver from the idle state to the active state.

8. The user equipment of claim 1, wherein the indication identifying packets associated with background traffic comprises a start time indicating when background traffic starts and an end time indicating when background traffic ends.

9. The user equipment of claim 1, wherein the indication identifying packets associated with background traffic comprises an information element provided by dedicated signaling, wherein the information element includes a de-prioritization bit, the de-prioritization bit being set in a first state to signal de-prioritization of background traffic when active traffic is detected and set in a second state to signal background traffic is not to be de-prioritized.

10. The user equipment of claim 9, wherein the information element comprises a field for setting a maximum hold time for the packets associated with background traffic.

11. The user equipment of claim 9, wherein the information element comprises a media access control (MAC) control element (CE).

12. The user equipment of claim 9, wherein the information element comprises a radio resource control (RRC) message.

13. A method for managing background traffic, comprising:
processing, by a processor of a user equipment, packets received and transmitted by a radio of the user equipment to and from an eNodeB;
executing one of a plurality of operation states for the user equipment, including an idle state and an active state; and
providing, by the processor of the user equipment for transmission to the eNodeB, an indication to identify packets associated with background traffic for the eNodeB to hold when the user equipment is executing the idle state, and to identify packets associated with active traffic for the eNodeB to send to the user equipment with a wake-up signal to transition to the active state when the user equipment is executing the idle state.

14. The method of claim 13, wherein the providing an indication to identify packets associated with background traffic comprises providing a bit in a header of a packet, wherein the bit is set in a first state to indicate the packet is associated with background traffic and the bit is set in a second state to indicate the packet is associated with active traffic.

15. The method of claim 14, wherein the providing the indication to identify packets associated with background traffic comprises providing the indication to identify packets associated with background traffic by an application through an application programming interface (API).

16. The method of claim 13, wherein the providing the indication identifying packets associated with background traffic comprises providing an identification of a port number and a protocol type associated with background traffic.

17. The method of claim 13, wherein the providing the indication identifying packets associated with background traffic comprises performing intelligent prediction of background traffic by categorizing arriving packets as background packets when the user equipment is executing the idle state.

18. The method of claim 13 further comprising transitioning the user equipment from the active state to the idle state when all applications are arranged to only send background traffic, the background traffic being maintained in an uplink buffer until the user equipment transitions to an active state.

19. The method of claim 13, wherein the providing the indication identifying packets associated with background traffic comprises providing a start time indicating when background traffic starts and an end time indicating when background traffic ends.

20. The method of claim 13, further comprising:
providing to a node an information element through dedicated signaling, wherein the information element includes a de-prioritization bit, the de-prioritization bit being set in a first state to signal de-prioritization of background traffic when active traffic is detected and set in a second state to signal background traffic is not to be de-prioritized.

21. An enhanced base station (eNodeB), comprising:
a buffer for maintaining packets received from a user equipment (UE) prior to processing and for maintaining packets for transmission to the UE; and
a processor, coupled to the buffer, the processor arranged to receive an indication from the UE identifying packets associated with background traffic for applications executed via the UE, the processor to process packets according to the received indication, including, when the UE is executing an idle state:
holding the packets associated with background traffic from transmission to the UE; and
transmitting packets associated with active traffic to the UE and a wake-up signal for the UE to transition from the idle state to an active state.

22. The eNodeB of claim 21, wherein the indication identifying packets associated with background traffic comprises instructions for setting a bit in a header of a packet, wherein the bit is set in a first state to indicate the packet is associated with background traffic and the bit is set in a second state to indicate the packet is associated with active traffic.

23. The eNodeB of claim 21, wherein the indication identifying packets associated with background traffic comprises instructions for associating a port number and a protocol type associated with background traffic.

24. The eNodeB of claim 21, wherein the indication identifying packets associated with background traffic comprises instructions for establishing a start time associated with background traffic and an end time associated with background traffic.

25. At least one non-transitory machine readable medium comprising instructions that, when executed by the machine, cause the machine to perform operations for managing background traffic, the operations comprising:
processing, by a processor of a user equipment, packets received and transmitted by a radio of the user equipment to and from an eNodeB over a wireless communication channel;
executing one of a plurality of operation states for the user equipment, including an idle state and an active state; and
providing, by the processor of the user equipment for transmission to the eNodeB, an indication to identify packets associated with background traffic for the eNodeB to hold when the user equipment is executing the idle state, and to identify packets associated with active traffic for the eNodeB to send to the user equipment with a wake-up signal to transition to the active state when the user equipment is executing the idle state.

26. The at least one non-transitory machine readable medium of claim 25, wherein the providing an indication to identify packets associated with background traffic comprises providing a bit in a header of a packet, wherein the bit is set in a first state to indicate the packet is associated with background traffic and the bit is set in a second state to indicate the packet is associated with active traffic.

27. The at least one non-transitory machine readable medium of claim 25, wherein the providing the indication identifying packets associated with background traffic comprises selecting one from a group consisting of:
providing, to the eNodeB, an identification of a port number and a protocol type associated with background traffic;
performing intelligent prediction of background traffic by categorizing arriving packets as background packets when the radio is in an idle state;
providing, to the eNodeB, a start time indicating when background traffic starts and an end time indicating when background traffic ends.

* * * * *